Jan. 11, 1955 E. J. ADAMS 2,698,958
PIVOT CONSTRUCTION
Filed Sept. 3, 1949

Inventor
Edmund J. Adams
By Spencer, Willits, Helwig & Baillio
Attorneys

United States Patent Office 2,698,958
Patented Jan. 11, 1955

2,698,958

PIVOT CONSTRUCTION

Edmund J. Adams, Detroit, Mich., assignor to General Motors Corporation, Detroit, Mich., a corporation of Delaware Application September 3, 1949, Serial No. 114,030

4 Claims. (Cl. 16—140)

The invention relates to pivot constructions particularly adapted to members whose relative angular positions are desired to be adjustable by application of direct manual force to one or both thereof, but which normally maintain any set angular relationship by their frictional resistance to movement at the pivotal connection. Two examples of the uses of my invention, disclosed herein for illustrative purposes, are in pivots for automotive vehicle side ventilating windows and interior sun visors, both of which are desired to be adjustably movable about a pivotal axis by hand pressure to a desired angular setting and to remain in such set position undisturbed by vibration and wind forces incident to vehicle operation.

The principal object of my invention is to provide a pivot construction of the aforementioned type having improved friction holding characteristics, and which requires no lubrication yet is noiseless in operation, is inexpensive to manufacture and assemble, and is adapted to convenient adjustment of its frictional holding characteristics.

Another and more specific object of my invention is to provide such an improved pivot construction employing a bushing member of resilient plastic material having a plurality of circumferentially spaced wedge-shaped portions locked against rotation relative to one of the pivotally associated members and in bearing engagement with the other of said members, said bushing member being axially movable relative to the members to effect a desired bearing pressure and thereby a desired resistance to pivotal movement.

These and other objects and advantages of my invention will be readily apparent from the following description, having reference to the drawing which illustrates two specific structural embodiments thereof, and wherein:

Figure 4 is an elevational view of another form of my invention in a pivotal mounting for an automotive vehicle sun visor or the like.

Figure 4:
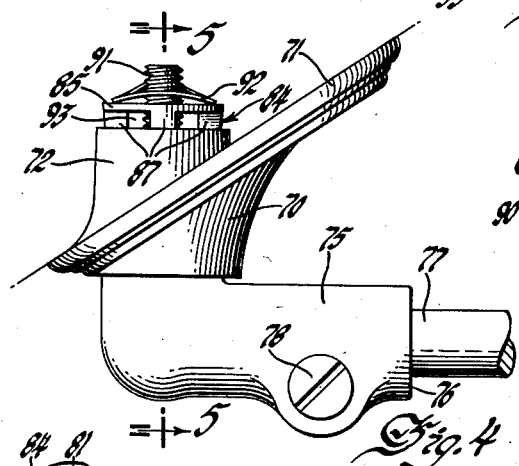
Figure 5:
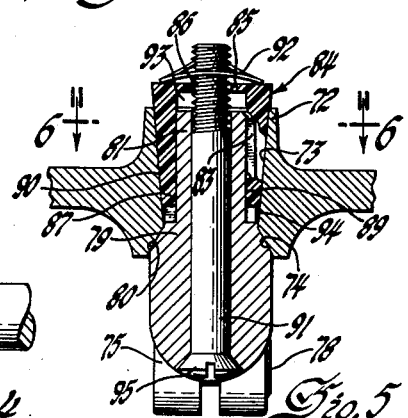
Figure 6:
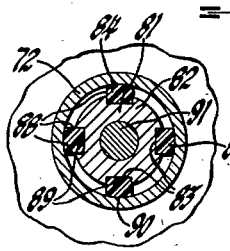

Figures 5 and 6 are sectional views taken substantially on lines 5—5 and 6—6 of Figures 4 and 5, respectively.

Figure 7:
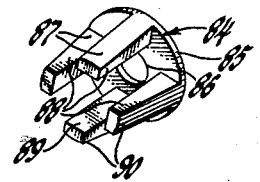

Figure 7 is a perspective view of the bushing member employed in the pivot construction of Figures 4, 5 and 6.

Figure 8:
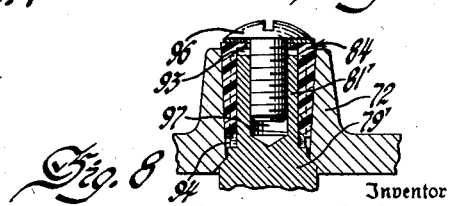

Figure 8 is a sectional view similar to Figure 5 but showing a modification of this form of my invention.

Figures 1, 2:
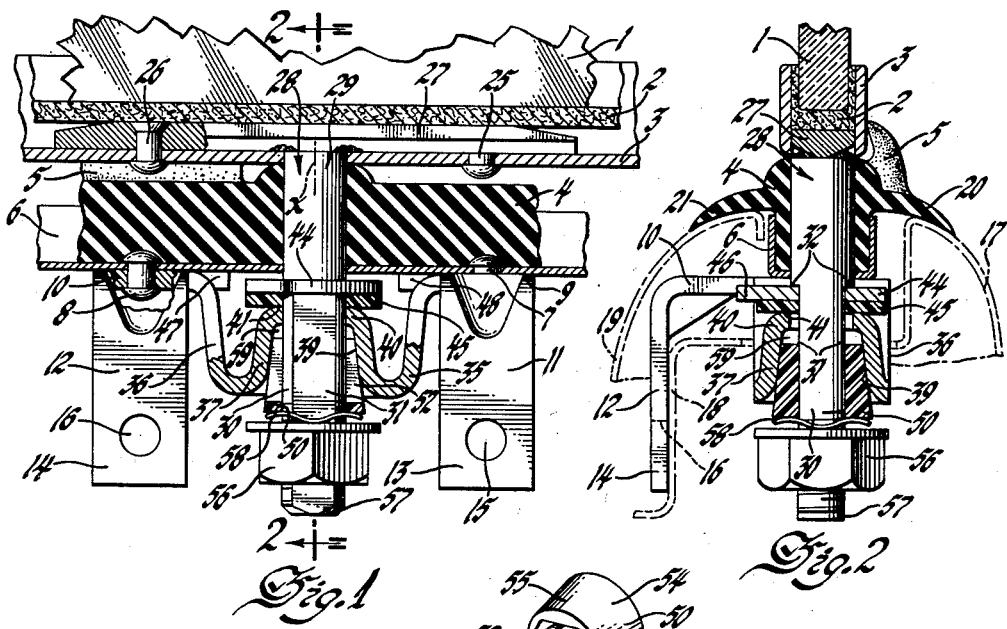
Figure 1 is a sectional elevational view of a portion of an automotive vehicle ventilator window assembly, showing its lower pivot construction which embodies the principles and features of my invention.
Figure 2 is a sectional view taken substantially on line 2—2 of Figure 1.

Referring first to Figures 1 and 2 of the drawing, the numeral 1 designates the pane of a window, the lower marginal edge of which is sealed by a channel section strip 2 of felt or the like within a reinforcing channel 3, these three elements being rotatable as an assembly about a substantially vertical axis x and constituting an adjustable closure for an opening in a door or other side wall forming structure of a vehicle. 4 is a weatherstrip of conventional design and made of rubber or like material with a lip portion 5 on each side of the axis x against which opposite sides of the channel 3 sealingly abut when the window is in closed position. This weatherstrip 4 is seated in a supporting channel 6 which is fixedly secured as by rivets 7 and 8 to the respective horizontally extending upper arms 9 and 10 of L-shaped brackets 11 and 12. The downwardly extending arms 13 and 14 of the brackets, in turn, are adapted to be secured to the door or other side forming structure of the vehicle as by rivets or screws through the apertures 15 and 16. One illustrative form which the door or side structure may take is indicated in broken lines in Figure 2: 17 being an outer sheet metal panel, 18 an inner panel, and 19 a garnish molding. Flange portions 20 and 21 of the weatherstrip 4 overlie the outer panel and garnish molding to cover the space therebetween, and the inner panel provides the support for the brackets 11 and 12. It will be understood, of course, that anchorage of the weatherstrip supporting channel 6 to the vehicle side structure may be provided at various points along its length in addition to those served by the brackets 11 and 12. The structure thus far described is old in the art and does not form any part per se of my invention.

Seated within the window pane reinforcing channel 3 and secured thereto as by rivets 25 and 26 is the head 27 of a T-bolt 28 which rotatively carries the window in the pivot construction to be now described. The shank 29 of this bolt, whose longitudinal axis constitutes the axis x previously referred to, is preferably cylindrical and extends downwardly from the window through the channel 3, weatherstrip 4 and the weatherstrip reinforcing channel 6. The lower portion 30 of this shank, below the channel 6, is made non-circular in cross section, as by relieving its otherwise cylindrical periphery to provide one or more flats 31. These flats are parallel with the axis x and terminate at their upper ends in shoulders 32 on the shank of the bolt.

Rigidly suspended between the brackets 11 and 12 and preferably joined integrally to the horizontally extending upper arms 13 and 14 thereof as by straps 35 and 36 is a socket forming sleeve member 37. This sleeve member has a tapered bore 39 concentric with the lower shank portion 30 of the bolt 28. Around the upper and smaller end of this bore the sleeve's side wall flanges inwardly as at 40 to provide an upwardly facing annular bearing surface 41. Obviously the brackets 11 and 12, straps 35 and 36, and the sleeve member 37 may be most simply formed as a one-piece steel stamping.

In abutting relation with the shoulders 32 on the bolt shank and apertured to fit the non-circular lower portion 30 of the latter so as to rotate therewith during angular adjustments of the window 1 is a stiff washer-like plate 44 of steel or equivalent material. Between this plate and the annular bearing surface 41 is a resilient plastic washer 45 which also fits and turns with the non-circular shank portion 30. A portion 46 on one side of the plate 44 extends outward beyond the outer periphery of the plastic washer 45 to serve as a dog for limiting the opening movement of the window. A stop in the form of an integral projection 47 on the bracket 12 is provided for engagement by the dog 46 at the extreme open position of the window. In order that the pivot construction may be adapted for use with a window which opens in the opposite direction, a similar stop 48 projects from the bracket 11.

Figure 3:
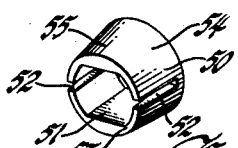
Figure 3 is a perspective view of the bushing member employed in the pivot construction of Figures 1 and 2.

50 is an externally tapered bushing member of resilient plastic material which radially supports the bolt shank 28 coaxially of the sleeve member 37. This bushing member has a non-circular bore 51, which slidably fits the non-circular portion 30 of the bolt shank, and, as best seen in Figure 3, its wall section is slit as at 52 for nearly its full length in one or more places to provide a degree of freedom for circumferential expansion and contraction. The slits preferably extend from the upper (smaller) end 53 of the bushing member to a point just short of its lower (larger) end 54, leaving a circumferentially continuous solid portion adjacent the latter, and its tapered outer wall surface 55 conforms with the tapered bore 39 into which its smaller end extends. A nut 56 is threaded onto the lower end 57 of the shank portion 30, and serves to hold the bushing member 50 in firm contact with the tapered bore 39 while simultaneously drawing the bolt shank downwardly to seat the plastic washer 45 firmly on the annular bearing surface 41 formed by the flange 40. 58 is a spring washer to provide resilience to the clamping effect of the nut 56. As clearly shown in Figures 1 and 2, the bushing member 50 is made sufficiently large in external diameter that when seated in the tapered bore 39 it does not abut the in-turned flange 40, there being a clearance space 59 between them to allow for longitudinal adjustment of the bushing member to take up any wear occurring in use.

A particularly desirable material for both the washer 45 and the bushing member 50 is the polyamide commonly known as "Nylon," comprising the copolymers of adipic acid and hexamethylene-di-amine. These parts when made of this material have good dimensional stability under widely varying temperature and humidity conditions. And, while they have the necessary hardness to substantially maintain their shape under the pressures applied thereto, they are sufficiently resilient and yieldable to effect a close-fitting frictional engagement with the metal surfaces confining them. Further, they are practically noiseless in operation and do not require lubrication.

Figures 4-7 illustrate another application of my invention, in somewhat different structural form, to a pivotal mounting for a conventional automotive vehicle inside sun visor. 70 is a stationary bracket having a flange portion 71, which may be secured by screws or other means not shown to a suitable mounting pad on the vehicle, and a sleeve portion 72 with a tapered bore 73. Surrounding the entrance to the smaller end of the bore 73 is a conical seating surface 74. 75 is a movable bracket of generally L-shape having one arm 76 adapted to receive a visor carrying rod 77 which is coaxially rotatable therein and clamped by a screw 78. The other arm 79 is rotatably supported in the tapered bore 73 and has an inclined shoulder 80 in bearing engagement with the conical seating surface 74. Its shaft portion 81 which projects centrally from the shoulder 80 is provided with full-length longitudinally extending external splines 82, between each pair of which is a square-bottom recess or groove 83. Fitting over the extended end of the shaft portion 81 is a spider like bushing member 84 which serves to radially support the arm 79 within the tapered bore 73. As best shown in Figure 7, this bushing member consists of an end ring 85 which is centrally apertured at 86 and provided with a plurality of longitudinally extending integral leg portions 87, equal in number to the number of splines on the shaft portion 81. These leg portions 87 have flat side and inner faces 88 and 89 which slidably fit the inter-spline recesses 83, and outwardly facing surfaces 90 which are rounded and taper inwardly from the end ring 85 to conform with the tapered bore 73. A bolt 91 passes longitudinally through the arm 79 and secures a nut 92 in abutment against the end ring 85 of the bushing member. By tightening this nut 92 the bushing member may be slidably moved along the splined shaft portion 81 to adjustably effect a firm wedging engagement between the grooves 83 and the tapered bore 73, which in turn holds the shoulder 80 in abutment with the conical seating surface 74. As will be clear from Figure 5, this adjustment may be made by axially rotating the bolt 91 with a screw driver, the slotted head 95 of the bolt being accessible for this purpose without necessitating the removal of the stationary bracket 70 from its mounting on the vehicle. Alternatively, and where this feature of accessibility of the adjustment means is dispensed with, the bushing member 84 may be secured by a simple screw 96 which threadedly engages a blind hole 97 provided in the end of the shaft portion 81' of the movable bracket's arm 79', as shown in Figure 8. Ample clearance spaces 93 and 94 are provided as shown in Figure 5, to accommodate longitudinal adjustment of the bushing member on the shaft section for taking up wear during use.

The bushing member 84 is made of the same resilient plastic material employed for the bushing member 50 and washer 45 described above in connection with pivot construction of Figures 1-3.

I claim:

1. In a pivotal mounting for a sun visor or the like to a vehicle structure, a first bracket adapted to movably carry the visor and having an axially rotatable shaft portion extending therefrom, said shaft portion having a passage extending longitudinally therethrough and an externally splined reduced diameter section adjacent its end remote from said first bracket, a second bracket adapted to be fixedly secured to the vehicle structure and provided with a tapered bore receiving said reduced diameter section, an annular thrust face on said second bracket adjacent the smaller end of said tapered bore, said shaft portion being in end-wise abutting relation with said annular thrust face adjacent one end of said reduced diameter section, a resiliently compressible bushing member radially supporting said reduced diameter section within said bore, said bushing member including an end portion and a plurality of elongated portions integrally associated therewith, said elongated portions being seated in the inter-spline recesses on said reduced diameter section and having outer faces in bearing relation with said tapered bore, and clamping means extending through said passage and engaging said bushing member end portion for adjustably forcing the bushing member elongated portions toward the smaller end of said bore.

2. In a pivot construction, a first member having a portion defining a tapered bore and terminating adjacent the small end thereof with an annular bearing face, a second member in abutting relation with said bearing face and including a shaft extending longitudinally through said bore, said shaft having a plurality of circumferentially spaced external splines extending longitudinally of its axis, a spider member having a plurality of elongated legs seated in the inter-spline spaces on the shaft and projecting radially outward therefrom into close-fitting direct journalling engagement with said tapered bore, and means carried by said second member for moving said spider member longitudinally of the shaft toward the small end of said bore to effect a desired resistance to rotation between said first and second members.

3. The invention defined by claim 2, wherein said spider member is made of a synthetic linear polyamide.

4. A pivot construction comprising a first member having a tapered bore, a second member adapted to rotate relative to the first member about the axis of said bore and having a longitudinally splined portion extending thereinto, and a one-piece spider member having a plurality of elongated legs interfitting the splines of said second member portion and tapered to conform with and directly bear on and radially space said second member in said bore.

References Cited in the file of this patent

UNITED STATES PATENTS

| | | |
|---|---|---|
| 622,686 | Holck | Apr. 11, 1899 |
| 978,291 | Helmus | Dec. 13, 1910 |
| 1,033,397 | Hauquitz | July 23, 1912 |
| 1,589,004 | Stone | June 15, 1926 |
| 1,768,810 | Walton | July 1, 1930 |
| 1,797,296 | Ray | Mar. 24, 1931 |
| 1,956,040 | Meyer | Apr. 24, 1934 |
| 1,960,505 | Penfield | May 29, 1934 |
| 2,051,428 | Tatlow | Aug. 18, 1936 |
| 2,110,120 | Ball | Mar. 8, 1938 |
| 2,246,086 | Austin | June 17, 1941 |
| 2,260,403 | Preston | Oct. 28, 1941 |
| 2,499,165 | Roethel | Feb. 28, 1950 |
| 2,582,420 | Ellis | Jan. 15, 1952 |

FOREIGN PATENTS

| | | |
|---|---|---|
| 201,449 | Great Britain | Aug. 2, 1923 |
| 246,851 | Great Britain | Apr. 28, 1927 |